US007761427B2

(12) United States Patent
Martin et al.

(10) Patent No.: US 7,761,427 B2
(45) Date of Patent: Jul. 20, 2010

(54) METHOD, SYSTEM, AND COMPUTER PROGRAM PRODUCT FOR PROCESSING AND CONVERTING ELECTRONICALLY-STORED DATA FOR ELECTRONIC DISCOVERY AND SUPPORT OF LITIGATION USING A PROCESSOR-BASED DEVICE LOCATED AT A USER-SITE

(75) Inventors: John Martin, Round Hill, VA (US); Jennifer St. James Cody, The Plains, VA (US); Christopher Shepley, Hyattsville, MD (US)

(73) Assignee: Cricket Technologies, LLC, Reston, VA (US)

( * ) Notice: Subject to any disclaimer, the term of this patent is extended or adjusted under 35 U.S.C. 154(b) by 420 days.

(21) Appl. No.: 10/821,949

(22) Filed: Apr. 12, 2004
(Under 37 CFR 1.47)

(65) Prior Publication Data
US 2005/0027750 A1 Feb. 3, 2005

Related U.S. Application Data (60) Provisional application No. 60/540,002, filed on Jan. 30, 2004, provisional application No. 60/461,895, filed on Apr. 11, 2003.

(51) Int. Cl.
*G06F 12/00* (2006.01)
*G06F 17/30* (2006.01)

(52) U.S. Cl. .................. 707/661; 707/705; 707/942; 707/952

(58) Field of Classification Search .................. None
See application file for complete search history.

(56) References Cited

U.S. PATENT DOCUMENTS

| 5,745,900 | A  | * | 4/1998 | Burrows | 707/102 |
|---|---|---|---|---|---|
| 5,978,917 | A  | * | 11/1999 | Chi | 726/22 |
| 6,098,079 | A  | * | 8/2000 | Howard | 707/205 |
| 6,334,126 | B1 |   | 12/2001 | Nagatomo et al. | 707/4 |
| 6,421,726 | B1 | * | 7/2002 | Kenner et al. | 709/225 |
| 6,738,760 | B1 | * | 5/2004 | Krachman | 707/3 |
| 6,745,197 | B2 | * | 6/2004 | McDonald | 707/102 |
| 7,010,657 | B2 | * | 3/2006 | Lowe et al. | 711/165 |
| 2002/0059317 | A1 | * | 5/2002 | Black et al. | 707/200 |
| 2002/0103834 | A1 | * | 8/2002 | Thompson et al. | 707/526 |
| 2003/0131241 | A1 | * | 7/2003 | Gladney | 713/176 |
| 2003/0135499 | A1 | * | 7/2003 | Schirmer et al. | 707/6 |
| 2003/0145209 | A1 | * | 7/2003 | Eagle et al. | 713/179 |
| 2004/0039933 | A1 | * | 2/2004 | Martin et al. | 713/200 |

(Continued)

OTHER PUBLICATIONS

"Windows Tips—How to create a file association for your programs, using the registry" http://phi.lho.free.fr/windows_tips/FileAssociations.en.html, dated Jun. 3, 1999.*

(Continued)

*Primary Examiner*—John R. Cottingham
*Assistant Examiner*—Michael Pham
(74) *Attorney, Agent, or Firm*—Oblon, Spivak, McClelland, Maier & Neustadt, L.L.P.

(57) ABSTRACT

A system, apparatus, method, and computer program product for electronically stored file profiling and conversion including converting printable files to images, supported by metadata, and one or more searchable master text files.

40 Claims, 7 Drawing Sheets

U.S. PATENT DOCUMENTS

| | | | |
|---|---|---|---|
| 2004/0103367 A1* | 5/2004 | Riss et al. | 715/506 |
| 2004/0187075 A1* | 9/2004 | Maxham et al. | 715/511 |
| 2004/0193631 A1* | 9/2004 | Kumashio | 707/100 |
| 2004/0199555 A1* | 10/2004 | Krachman | 707/204 |
| 2004/0205644 A1* | 10/2004 | Shaughnessy et al. | 715/530 |
| 2005/0141028 A1* | 6/2005 | Koppich | 358/1.15 |

OTHER PUBLICATIONS

John McIver, "AutoVue Solid Model Professional Version 15—Review" http://www.cadinfo.net/reviews/AutoVUESolid.htm, retrieved version dated Feb. 2, 2003.*

University of California. "How much information 2003?" Oct. 27, 2003.*

\* cited by examiner

Features:
- Side-by-side view of metadata and native file
- Case-specific fields can be added to meet the individual needs of the project
- Mark one item at a time or an entire result set with case-specific fields
- Easy navigation between documents
- Icons to identify file types
- Combined full-text and fielded searching
- Add multiple conditions to searches
- Boolean, full-text, proximity, wild-card searching and stemming
- Save searches
- Run previous searches

METHOD, SYSTEM, AND COMPUTER PROGRAM PRODUCT FOR PROCESSING AND CONVERTING ELECTRONICALLY-STORED DATA FOR ELECTRONIC DISCOVERY AND SUPPORT OF LITIGATION USING A PROCESSOR-BASED DEVICE LOCATED AT A USER-SITE

CROSS REFERENCE TO RELATED PATENT DOCUMENTS

This application contains subject matter related to that disclosed in the following co-pending patent application, the contents of each of which are incorporated herein by reference: U.S. patent application Ser. No. 10/227,389 filed on Aug. 26, 2002; U.S. patent application Ser. No. 60/437,440 filed on Jan. 27, 2003; and U.S. patent application Ser. No. 60/461,895 filed on Apr. 11, 2003.

BACKGROUND OF THE INVENTION

1. Field of the Invention

This invention relates to systems, apparatuses, methods, and computer program products relating to profiling and processing of electronically stored document data. More particularly, the invention relates to data that may need to be produced by a party during a discovery phase of litigation, where the processing includes converting printable files to images, supported by meta-data, and one or more searchable text files.

2. Discussion of the Background

Computer-based discovery in legal proceedings is becoming more and more widespread as tools providing cost effective and legally sound data discovery of electronic information are being developed. An overview of computer-based discovery in federal civil litigation is provided in a Federal Courts Law Review article by Kenneth J. Withers, entitled Computer-Based Discovery in Civil Litigation and dated October 2000, the entire contents of which are incorporated herein by reference. This article notes how discovery is changing in response to the pervasive use of computers and how more and more cases involve e-mail, word processed documents and spreadsheets, and records of Internet activity. This article discusses some of the potential for computer-based discovery to reduce overall discovery costs and improve the administration of justice. The article also explores the unique problems of computer-based discovery. The appendix to this article provides a checklist of computer based discovery considerations regarding pretrial conferences under U.S. Federal Civil Procedure Rule 16(c).

In conducting computer-based discovery, problems arise with respect to the vast quantities of electronic documents that must be reviewed, whether for a party's document production in a litigation against another party, for conducting an internal investigation, or for satisfying government reporting requirements. A party's ability to manage each matter that can be mission critical depends on how fast it can capture, identify, review, assess, and produce relevant documents. The volume of electronic documents today far exceeds paper documents.

According to a 2000 University of California study by Lyan, P. and Vatian, H., entitled "How Much Information," (http://info.berkley.edu/how-much-info/) the entire contents of which are hereby incorporated by reference, over 90% of corporate documents are created electronically and an estimated 70% of those are never printed to paper. Additionally, e-mail communication among U.S. employees is approaching 3 billion a day. This has dramatically increased the volume, complexity, and cost of electronic document discovery. Moreover, emailing-employees (custodians) often have multiple data sets contained in multiple messaging systems. Electronic documents, whether e-mail stored on hard drives, backup tapes, etc. come in numerous file types (e.g., MICROSOFT WORD, COREL WORD PERFECT, MICROSOFT EXCEL, LOTUS 123, MICROSOFT OUTLOOK, SYMANTEC ACT, AND MICROSOFT OUTLOOK) as well as numerous versions. These documents are often times encoded and may be virus infected. Often a party is required to produce these vast amounts of electronic documents in paper form, a process that can be unjustifiably expensive without telescoping the retrieval of documents based on relevant issues.

Figure 1:
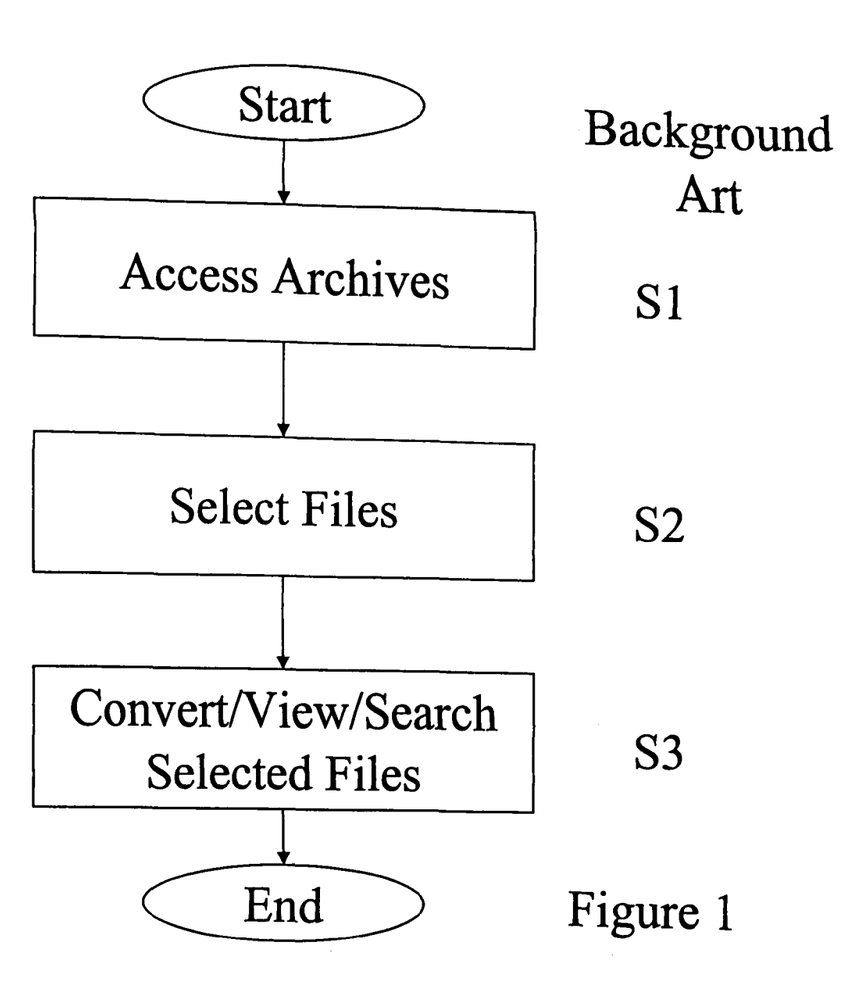
FIG. 1 is a flow diagram of a conventional method of selecting files to print as part of a litigation discovery process.

FIG. 1 is a flow chart that illustrates the electronic document legal discovery process common today. This conventional process begins in step S1 with accessing one or more data archives, followed by searching and filtering these archives in step S2 in order to identify documents that may be of interest, and printing these selected files in step S3. In some conventional systems, files of interest are not first converted to images before printing. Typically, the searching and filtering is restricted to parameters such as file-owner, date, destination, or other high-level file meta-data. These files are typically not searched or filtered by size, content for duplication, versions, encryption/encoding, corruption, or viruses. Typically, files printed or converted to images via this process are manually reviewed (at great expense) for relevancy, redundancy, and readability.

As noted previously, many of the printed documents are eventually found to be redundant, encoded, or somehow corrupted and thus illegible. Furthermore, conventional search and filtering processes are rudimentary and result in documents being printed that are not relevant to the legal discovery process. The costs of printing can be exorbitant and costs are greatly increased when review time of legal staff at high hourly rates is added. What is desired, as recognized by the present inventors, is a way to electronically screen, select, archive, search, retrieve, and view documents that are relevant to the legal discovery process while not incurring the large expense of having to convert to images and/or print unwieldy and largely useless and/or redundant materials that have to be reviewed in an inefficient, costly, manual manner.

In addition, conventional systems require the entire contents of an archive to be copied and sent to a remote facility for the above-described conventional file processing of FIG. 1. Thus, the inventors have also recognized economic advantages, operational efficiencies, and enhanced privacy/security associated with having an automated tool that (a) can be hosted at the facility in which the archives are located and (b) can be operated by the people knowledgeable about the content in the local archives.

In addition, conventional systems are limited by their reliance on the file extensions to identify file type (e.g., .doc, .wpd, .pdf). Since an author can change/create a file type, the file extension is not always an accurate identifier of the file type. What is desired is a way to identify file type without only relying on the file extension identifier. Also, once the file type is identified, conventional systems are often characterized as having a single, predetermined method of viewing the text associated with the file. Furthermore, no conventional systems are known to be able to quickly convert a file to an |image|, let alone to a plurality of proprietary image file |types|.

Conventional systems include Daticon's Discovery OnDemand, Merrill Corporation's Discovery Navigator, LSI's Electronicode, Doculex's Discovery Cracker, Pacific Legal's Discover-e Web Respository Solution, Bowne's CaseSoft, Mobious' HardCopy Pro Plus and EDD Workstation, Image Capture Engineering's Z-Print, and Applied Discovery's online review product.

In addition, conventional systems are constrained by not being able to simultaneously conduct a text-based search and a structured-data query (e.g., SQL). This slows the process of electronic discovery and search results assimilation. What is also desired, as discovered by the present inventors is a tool that allows for simultaneous text-based and structured-data searching, data integration, and archiving.

SUMMARY OF THE INVENTION

The present invention addresses and resolves the above identified, as well as other limitations, with conventional electronic file review and legal discovery systems and methods. The present invention provides a site-hostable, easy-to-implement infrastructure and technology for electronic document discovery. The present invention includes a software-based data profiler tool and/or hardware that enables users to effectively support electronic document discovery.

In the present invention, the software-based data profiler tool accesses data stored in a computer readable medium and then:

(1) allows users to search files in an electronic archive based on pre-determined content information and/or metadata and then to drag-and-drop selected files into an electronic profiling folder;

(2) identifies the files within the electronic folder that can be printed and/or converted for downstream visualization, content searching, and meta-data searching;

(3) identifies duplicate files and/or documents that can be eliminated from the electronic folder;

(4) (optionally) identifies corrupted files that can be exported for further processing;

(5) (optionally) identifies, cleans, and/or deletes and/or exports virus infected files/documents from the electronic folder;

(6) (optionally) identifies, decodes/decrypts, and/or deletes and/or exports encoded/encrypted files/documents from the electronic folder;

(7) creates an image of selected files in the electronic folder and appends meta-data associated with each file/document converted to the image;

(8) (optionally) time-stamps and digitally authenticates each non-editable image and associated meta-data to protect against future manipulation or destruction;

(9) exports each image and associated meta-data to an image viewer, and/or a printer, and/or a computer configured to search the image's meta-data, and/or normalizes the files to a degree by making them all fit a predetermined (e.g., 8.5"×11" letter sized) format, irrespective of the original document's size (e.g., a spreadsheet);

(10) creates one or more master text files, to include associated meta-data, containing the contents of one or more files from the electronic folder;

(11) (optionally) time-stamps and digitally authenticates the one or more master text files to protect against future manipulation or destruction; and (12) exports the one or more text files containing the contents of some or all of the selected files, along with associated meta-data, to an image viewer, and/or a printer, and/or a computer configured to search the contents of the text file(s) and/or the meta-data of the text file(s).

BRIEF DESCRIPTION OF THE DRAWINGS

A more complete appreciation of the present invention and many of the attendant advantages thereof will be readily obtained as the same becomes better understood by reference to the following detailed descriptions and accompanying drawings.

DETAILED DESCRIPTION OF THE PREFERRED EMBODIMENTS

The following comments relate to the drawings, wherein like reference numerals designate identical or corresponding parts throughout the several views.

Figure 2:
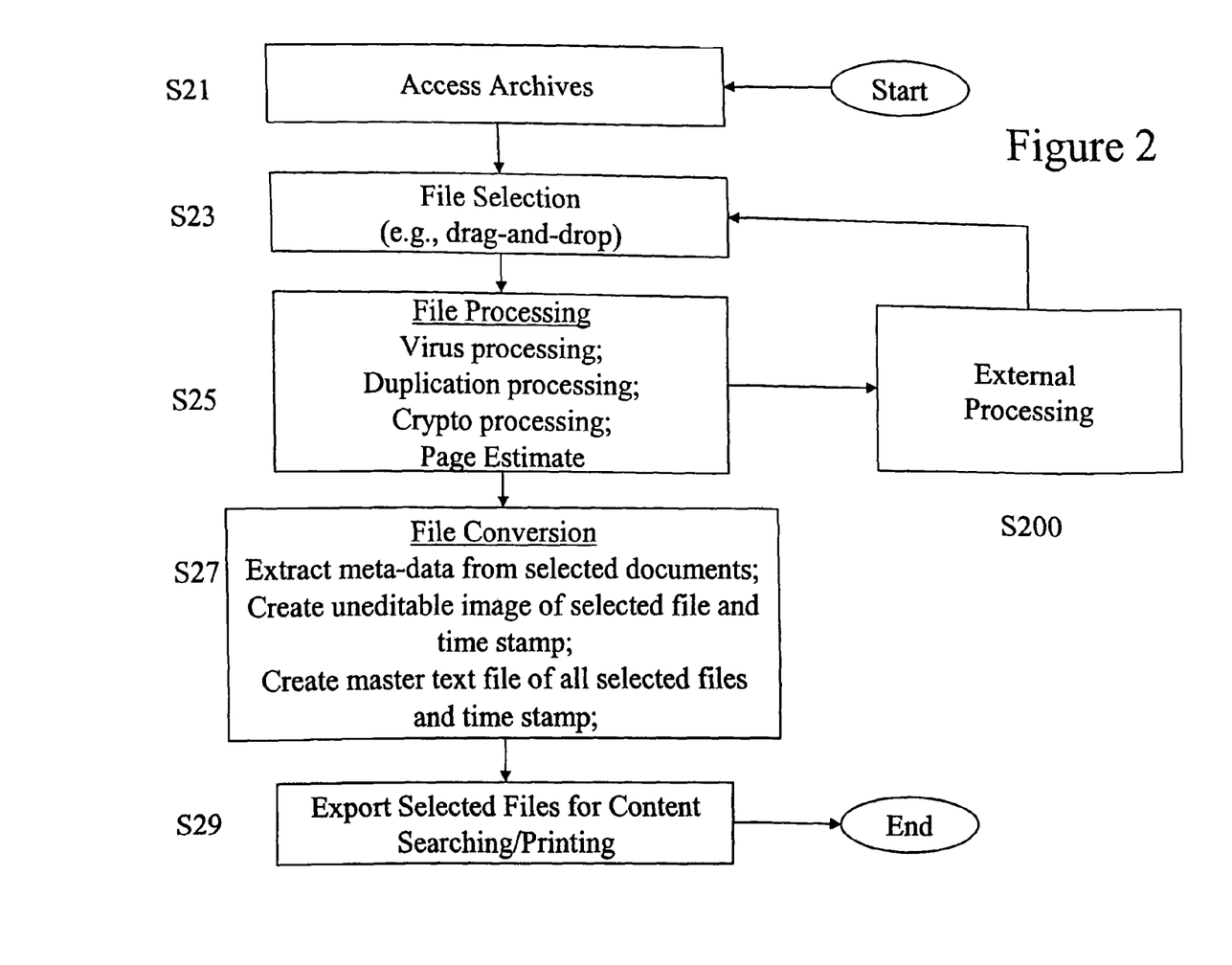
FIG. 2 is a high-level flow diagram of a method of electronic document data profiling of the present invention.

FIG. 2 illustrates an overview of a method employed by the present invention. Data is accessed in step S21. The date may be located in one or more databases or on more or more computers or other data archives. Files from these archives are manually or automatically transferred to a working electronic folder S23 for file processing S25. In one embodiment, transfer of files to the working electronic folder is via a tailorable, drag-and-drop user interface that may include using a computer mouse and/or other pointing device. The working electronic folder is tagged with meta-data including date created, last date opened, last date modified, creator name, matter name, and other identification and quality control data. Optionally, the working electronic folder may include a time-stamped audit file for recording a complete file history from file creation to file destruction.

File processing S25 includes checking for duplications, (optionally) viruses, (optionally) encoding and/or encryption. Optionally, page estimation and time stamping/digital authentication is also performed. Files that are duplicates are identified by a hash or other unique identifier (e.g., an email message ID). Files that cannot be processed are marked as exception files. Exception files may be those with a virus, or files that are encrypted, files that are corrupted, or files that are of an unknown or deselected file type. Files that require special processing and/or conversion may be exported for special processing in step S200. Files marked as exception files are logged and may also be exported.

Figure 3:
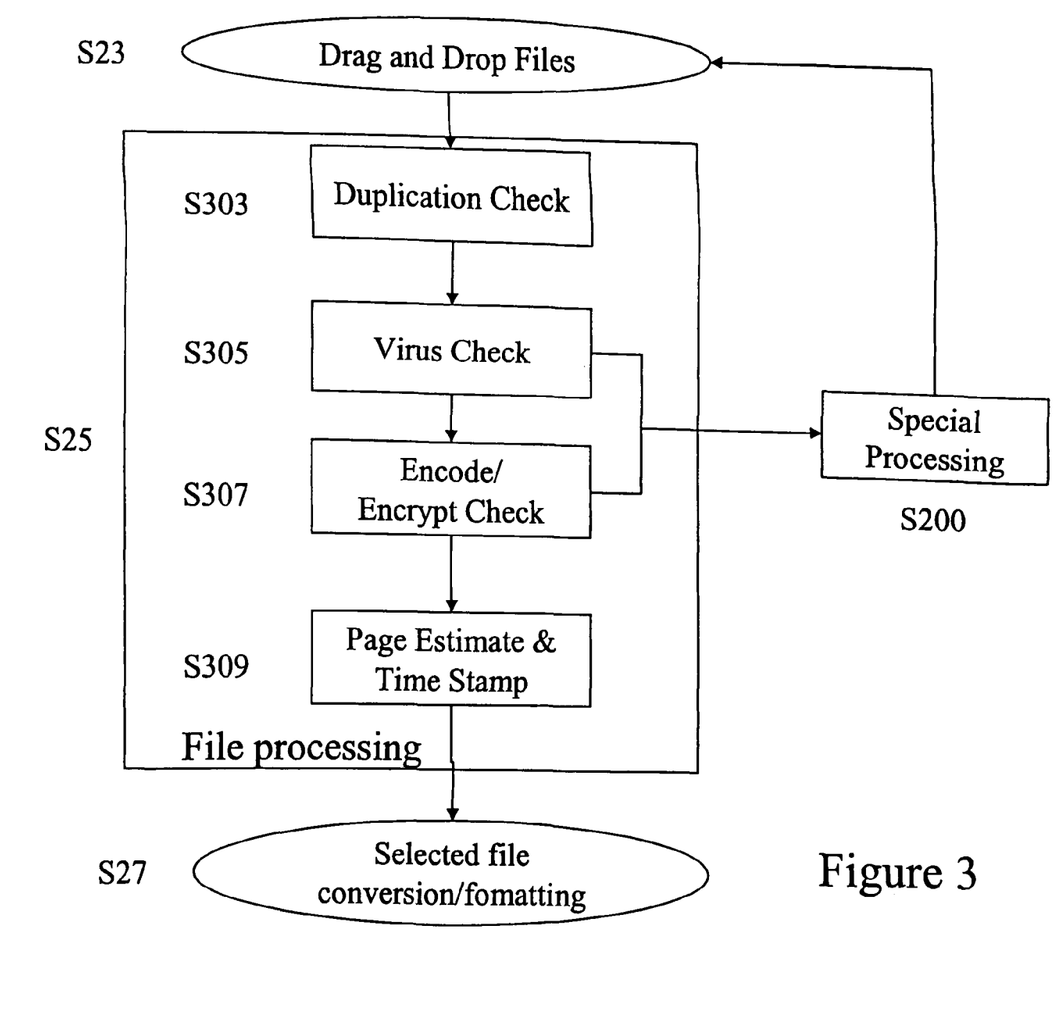
FIG. 3 is a detailed flow diagram of a method of electronic document data profiling of the present invention.

FIG. 3 illustrates details about the file processing of step S25. The inclusion of many of the following substeps varies with embodiment as does the ordering of the following substeps Files are then sent to a duplication identification process in step S303. In one embodiment, file duplication is determined by the MD5 hash algorithm developed by Professor Ronald L. Rivest of MIT.

De-duplicated files are checked for file corruptions in step S305. Corrupted files are either deleted or are exported for further processing S200.

Optionally, duplication-checked files are also subjected to a virus checking process in step S305. In one embodiment, virus checking is performed with a Perl File Scan Module supported by Amavis and Mime-defang.

Optionally, duplication checked files may be sent to an encoding and encryption identification process in step S307. Encoded/encrypted files are either deleted or are exported for further processing S200.

Optionally, files are then sent for time stamping/digital authentication and (optionally) a page estimation in step S309. In one embodiment, page estimation is based on actual page count. In another embodiment, page estimation is determined by a bytes-to-pages ratio which varies per file type. In another embodiment actual pages are read from file headers. At any time during this process, summary statistics can be stored, visualized, and/or printed.

After file processing S25, selected files are converted in step S27. The file conversion of step S27 includes
    extracting predetermined meta-data from each selected documents into a document-specific file of meta-data (e.g., an ASCII file of extracted meta-data);
    creating an image of each selected file and appending the document-specific file of extracted meta-data;
    (optionally) time stamping/digitally authenticating both the image and the file of extracted meta-data;
    (optionally) creating a searchable master text file (e.g., .txt, .doc, .rtf, .wp, etc.) containing the contents of all the selected files, and time stamping/digitally authenticating the master text file, and appending selected meta-data about the files included in the master text file;
    (optionally) creating one or more searchable subordinate text files (e.g., .txt, .doc, .rtf, .wp, etc.) containing the contents of an operator-selected subset of all the selected files, and time stamping/digitally authenticating the subordinate text files, and appending selected meta-data about the files included in the subordinate text files.

The meta-data extracted from the selected documents may relate to file content (e.g., litigation name, party name, etc.); content header information (e.g., privileged, confidential, etc.), file meta-data (e.g., author, recipient, date, etc.), file type (text document, presentation document, spreadsheet, etc.), or other criteria identified by the user (e.g., page count, individual keyword count, multiple keyword count, etc.). Time may correspond to UTC time and/or another predetermined time zone. The metadata file may be an ASCII file.

As noted above, profiling may also include extracting the text from the file(s) into an accompanying text file for later searching and filtering. Files that are images of text (e.g., image-only .pdf files) optionally may be converted to text with an OCR program. Either by predetermination or by selection, profiling may include either or both of the steps of compiling the metadata and extracting the text. The text of the entire file may be extracted. Alternatively, portions of the text may be selected with a mouse-like device for extraction. In addition, key words may be searched for in the document. Then, text around that keyword may be selected for extraction.

In one embodiment, the file processing includes using a prioritized plug-in module with the prioritization scheme keyed to the file type. The plug-ins may be selected to be 'ON' or 'OFF.' The plug-ins can also have differing priorities so that files not recognized by extension can be filtered first to the plug-ins most likely to recognize the file. File type is determined by both identifying the file type extension and evaluating the binary file header. The file type identification step may first consider the extension. When the extension is unknown, the binary header is evaluated. Alternatively, the binary header may be first considered. If there is a conflict between the header and the extension, the header or the extension may be considered a default first choice, either arbitrarily or based on a predetermined logic keyed to suggested file type.

Once a file type is suggested, the highest priority plug-in is used to read or otherwise view the text. For example, if file type A is suggested, the prioritized list of preferred plug-ins may be "1", "5", and "3". Some plug-ins may be able to open multiple file types. Also, multiple plug-ins may be able to open a single file-type. A plug-in may be a created by incorporating libraries of commercially available software products or a plug-in may be developing unique libraries of programming code that incorporates the functionality of a third party library or application to load, image and extract meta-data from a document. Examples of plug-ins include the AdobeAcrobat, AutoVue, Fallback, GnuZip, HTML, Lotus Notes, Microsoft Access, Microsoft Excel, Outlook, MSG, Microsoft PowerPoint, Microsoft Word, Tiff, Tar, and Zip plug-ins.

Files that are not correlated to a particular plug-in, or files that cannot be read by the suggested plug-ins, may instead be read by the AutoVue plug|in|.

Files that cannot be processed by the AutoVue plug-in may then be processed by using Microsoft Windows File Type Associations and the Fallback plug-in which may require installation of additional software applications. The Fallback plug-in is disabled by default. It is used to attempt to profile unknown documents. It does so by accessing the windows registry to determine if a "print" verb is associated with the extension in windows. If a "print" verb is found to be associated with the extension we start a new windows process with that verb as startup info and feed the output to our imaging print driver. The goal is to get images and text (but not meta-data as that requires lower level file access) from files that we have not developed a specialized plug-in for but for which third party applications do reside on the user's machine for manipulating.

Some identifiable file types may be designated as 'not-to-be processed' files. An executable files is an example of a 'not-to-be processed' file. However, some executable files may be processed since they may be assumed to contain text data (e.g., self-extracting zip files). In general, 'not-to-be-processed' files consist of non-printable files.

Processed files may be searched for keywords or key meta-data. Those files containing the searched item or parameter are automatically selected for export. The operator may view and deselect any file prior to export. |The| operator may also add files that do not contain the searched item or parameter.

Files are then imaged by an imaging module, such as a TIFFing driver. The format of the image file is user-|select-able| from a pre-determined set of document image formats (e.g., tiff, gif, .pdf.) Preferably, the imaging module will be capable of rapid imaging. Additionally, the imaging module will be tailorable. An example of a fast TIFFing driver is the Microsoft Office Document Imaging 2003 (MODI) driver.

The images and/or master/subordinate text file(s) are exported (and optionally are printed) in step S29 to an image viewer, and/or a printer, and/or a computer configured to search the corresponding meta-data and/or the master file's textual content. The exported data will include the images (e.g., TIFF) and may include the above-described meta-data file and/or extracted text file. The format of the exported file may be a proprietary litigation support software file type such as the IPRO Tech, Inc. (www.iprocorp.com) lfp. file type. Other specialty file types may include file types associated with litigation support software from Opticon, Concordance, Summation, and Ringtail. Also, a commercial data management file type may be used (e.g., Microsoft Access).

Prior to export, the files may be searched and filtered against stored or user-entered search and filtering criteria (or criteria selected by a user). Search criteria may be based on file content (e.g., litigation name, party name, etc.); content header information (e.g., privileged, confidential, etc.), file meta-data (e.g., author, recipient, date, etc.), file type (text document, presentation document, spreadsheet, etc.) or other criteria identified by the user. Standard filtering criteria may be saved for future editing and/or queries. Additionally, once received, the exported files may again be searched and filtered.

In an alternative embodiment, files in the original databases may be pre-filtered following the database access step S21 and preceding the initial file selection step S23. The pre-filtering criteria may be predetermined or user-entered. The pre-filtering criteria may be based on file content (e.g., litigation name, party name, etc.); content header information (e.g., privileged, confidential, etc.), file meta-data (e.g., author, recipient, date, etc.), file type (text document, presentation document, spreadsheet, etc.) or other criteria identified by the user. Standard pre-filtering criteria may be saved for future editing and/or |queries|.

In another embodiment, the processes of FIG. 2 can be integrated with the email and instant messaging archive processing process described in application Ser. No. 60/437,440 filed on Jan. 27, 2003. In this embodiment, both the email/instant message files and their printable attachments are processed as described previously.

A sample set of results from the process of FIGS. 2 and 3 is found in Tables 1 and 2 below. The "extension types" is an example of one of the predetermined search and filter criteria discussed above.

TABLE 1

Sample Detail Report

| Extension Types | Viruses | Duplicates | Total Files | Estimated Pages |
|---|---|---|---|---|
| BAK | 0 | 0 | 1 | 0 |
| bmp | 0 | 0 | 1 | 1 |
| com | 0 | 0 | 1 | 0 |
| com-access_log | 0 | 0 | 1 | 0 |
| com-error_log | 0 | 0 | 1 | 0 |
| doc | 0 | 0 | 3 | 3 |
| eps | 0 | 0 | 1 | 0 |
| gif | 0 | 1 | 22 | 300 |
| html | 0 | 0 | 19 | 19 |
| jbf | 0 | 0 | 2 | 0 |
| jpg | 0 | 4 | 46 | 46 |
| ori | 0 | 0 | 1 | 0 |
| pl | 0 | 0 | 1 | 0 |
| png | 0 | 1 | 41 | 0 |
| psd | 0 | 2 | 15 | 0 |
| psp | 0 | 0 | 17 | 0 |
| TIF | 0 | 4 | 9 | 0 |
| tmp | 0 | 0 | 1 | 0 |
| txt | 0 | 0 | 3 | 3 |
| unknown | 0 | 33 | 2 | 0 |
| wmv | 0 | 0 | 3 | 0 |

TABLE 2

Sample Summary Report

| | |
|---|---|
| Total Files Transferred In: | 600 |
| Total Duplicates: | 45 |
| Total Files Encoded: | 191 |
| Total Files Exported for Processing | 23 |
| Total Files Converted to Image | 321 |
| Total Estimated Printable Pages: | 472 |

In one embodiment of the present invention, the software is configured in accordance with a 'plug-in' architecture that allows for account-based reconfiguration of features; self-installing, externally delivered upgrades (e.g., via the Internet); and user-ID driven license/account management.

Figure 4:
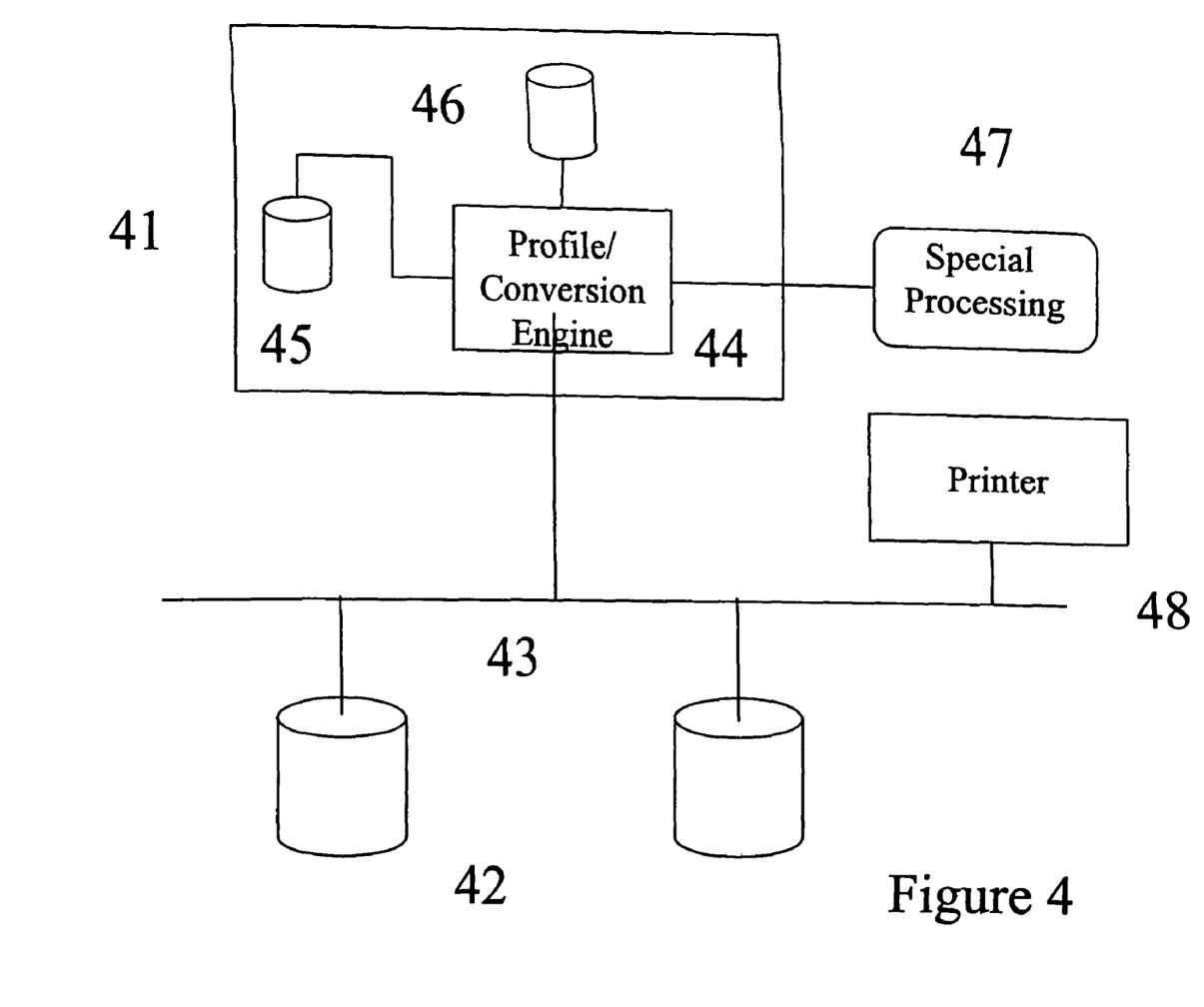
FIG. 4 is a block diagram of the present invention.

FIG. 4 illustrates the overarching system architecture of the present invention. The legal discovery tool 41 accesses one or more electronic file archives 42 via an interconnection media 43. The interconnection media 43 is preferably a local area network but may also be via wireless or direct storage media access. The electronic archives 42 may be of any commercial or proprietary structure (e.g., SQL, HTML, flat files, object-oriented) and content (e.g., documents, email, annotated images, annotated audio/video, etc.). The legal discovery engine 44 performs a filtering and selection operation with pre-stored and/or operator entered criteria 45. These criteria may include author name, file creation date, title, keyword, or other readily available meta-data. The results of the legal discovery process are stored in a separate repository 46. Files that pass the filtering process are then passed onward for file processing and conversion. Alternatively, files of interest are selected via a drag-and-drop or comparable process and then passed onward for file processing and conversion. Files that require special processing may be exported via multiple methods to a special processing infrastructure 47. At any time, files or statistical results of the legal discovery process may be sent to a printer 48 for printing via the interconnection media 43.

Figure 5:
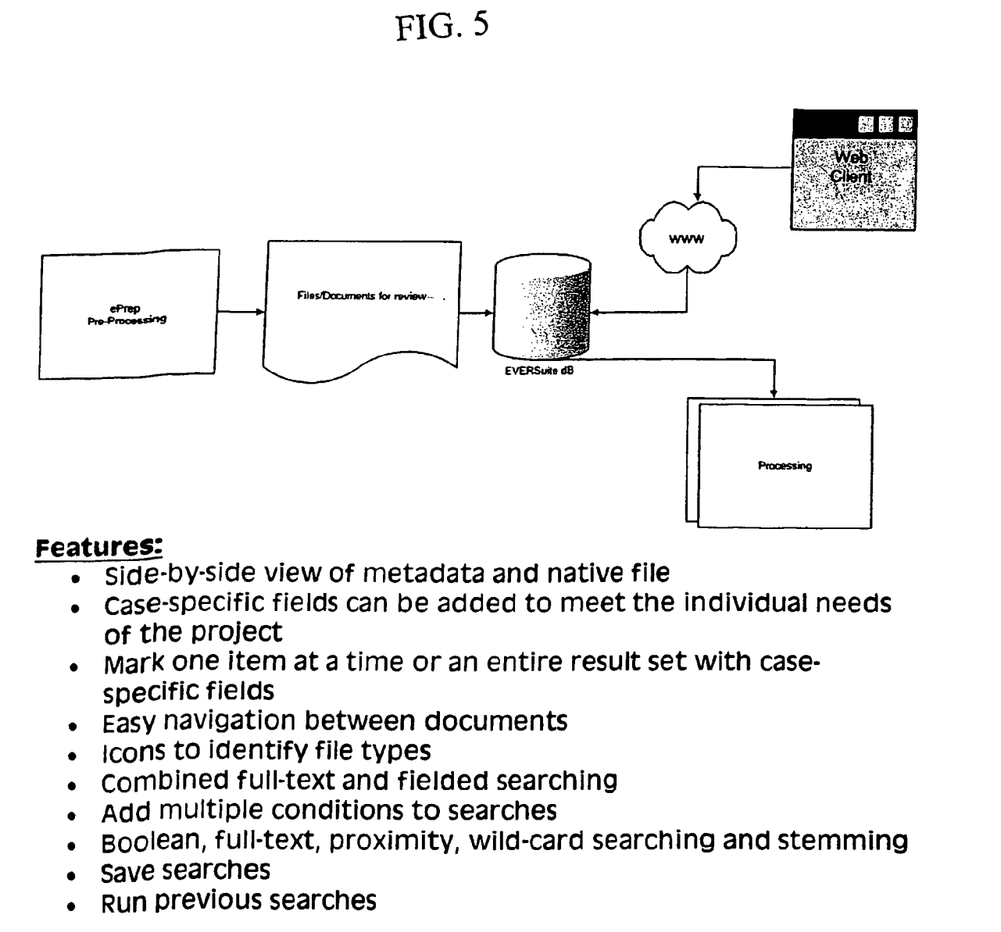
FIG. 5 is block diagram of another embodiment of the present invention.
Figure 6:
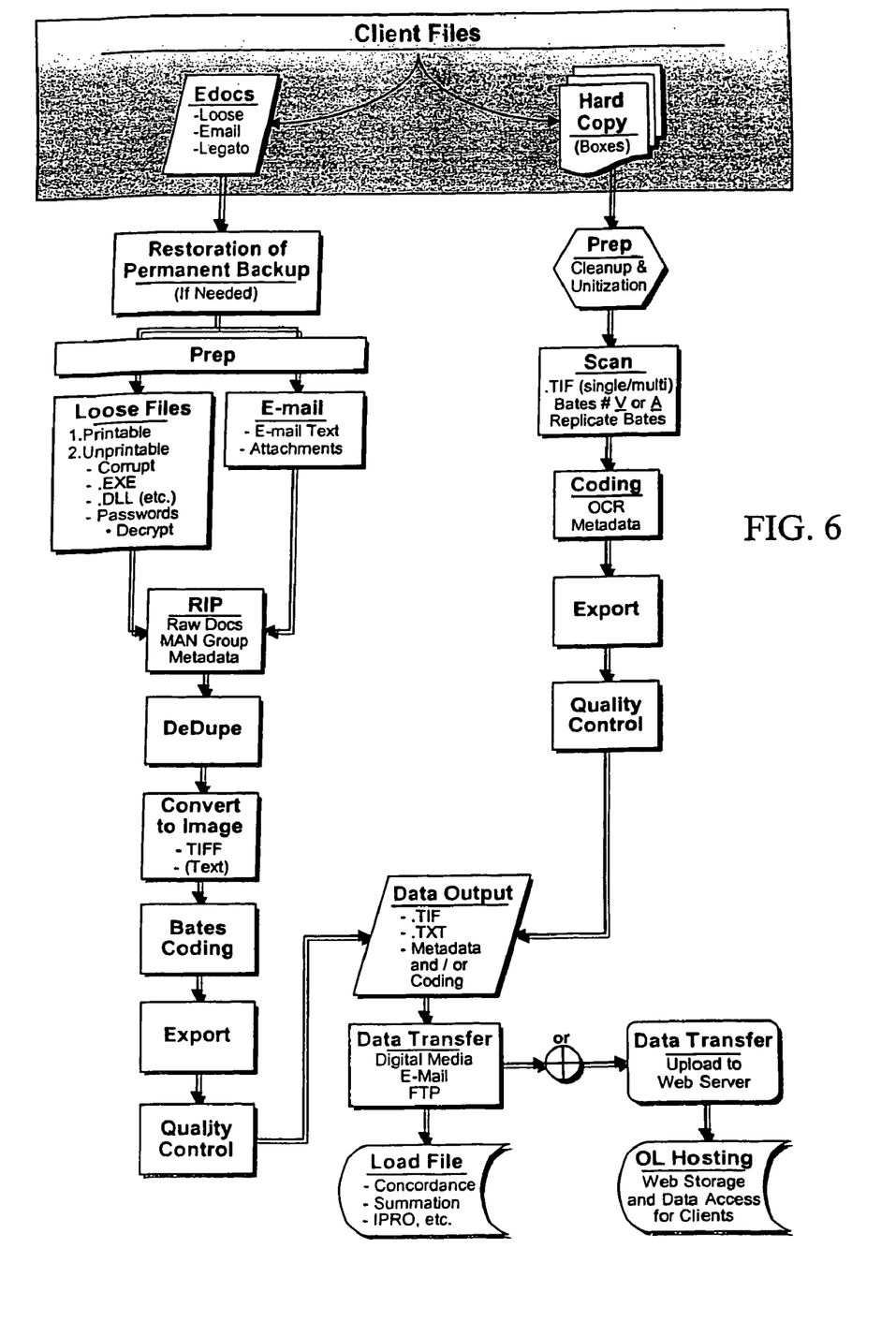
FIG. 6 is a flow chart of another embodiment of the present invention.

FIGS. 5 and 6 are a block diagram and a flow chart corresponding to another embodiment of the present invention in which a commercially available enterprise content management engine is adapted to carry out some of the novel features of the present invention. The commercially available content management enterprise is specifically adapted for the processes shown, to include enabling simultaneous text and structured data searching of electronic archives.

Figure 7:
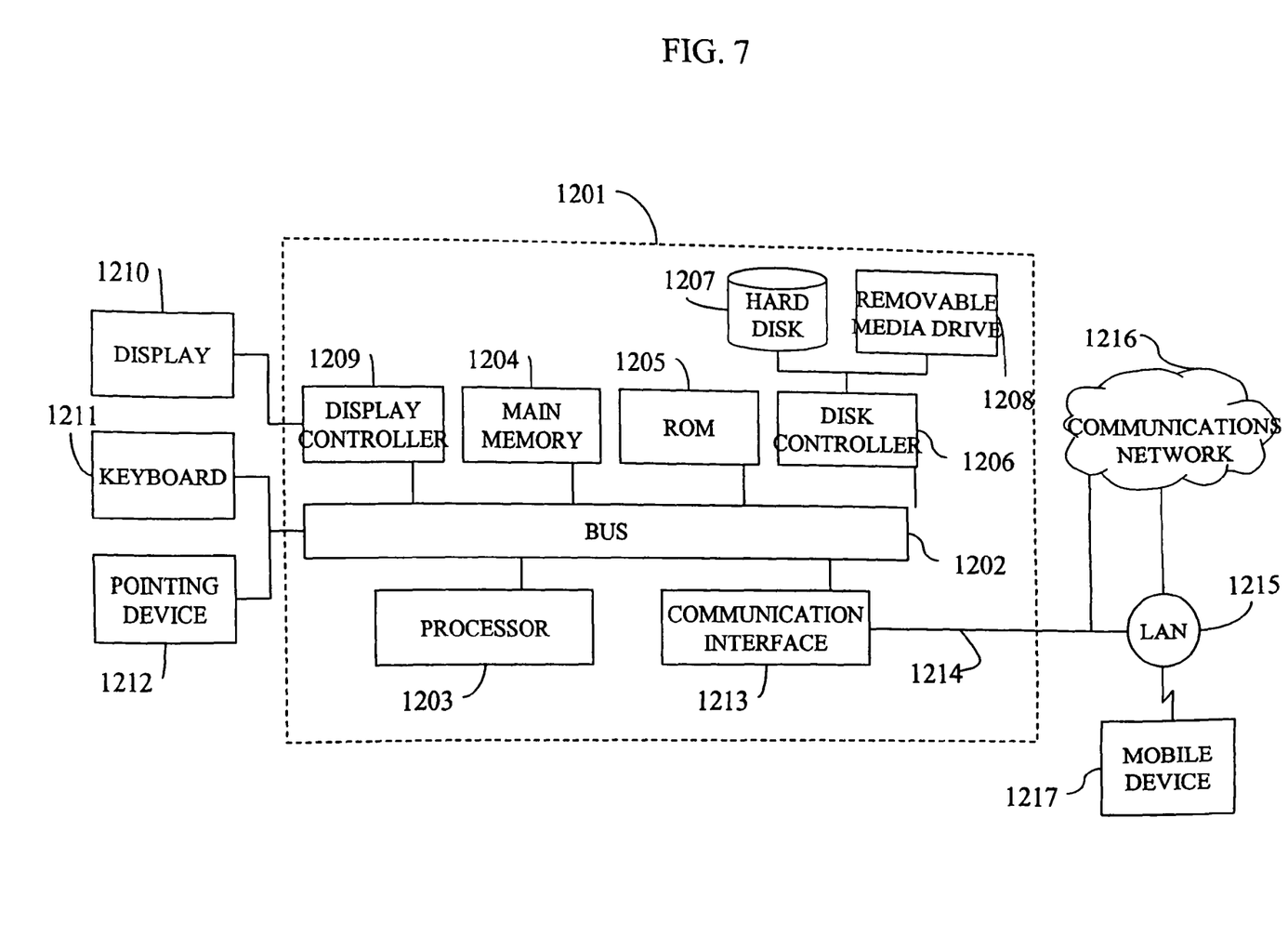
FIG. 7 is a block diagram of a computer used with the present invention.

FIG. 7 illustrates an example basic computer block diagram used in association with this invention. FIG. 7 illustrates a computer system 1201 upon which an embodiment of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable storage medium includes non-volatile media and volatile media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Wireless transmission media also may also take the form of acoustic or light waves, such as those generated during radio wave and infrared data communication.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214, and the communication interface 1213. Moreover, the network link 1214 may provide a connection through a LAN 1215 to a mobile device 1217 such as a personal digital assistant (PDA) laptop computer, or cellular telephone.

The present invention includes a user-friendly interface that allows individuals of varying skill levels to search numerous digital media archives and archive types as well as allows users to drag-and-drop selected files for one or more of the previously described processing steps. The user interface also allows users to design products and print statistical reports about information stored within these archives. The interface allows users to optionally enable virus checking and duplicate checking as well as to determine and display the file types, number of files, and estimate number printed pages of printable files. The interface also allows individuals to easily identify and tag duplicates, infected files, and encoded and encrypted files. The interface also allows individuals to create a time stamp for digital authentication for each file processed. The present invention allows for such files to be sent to another device for further processing.

In one embodiment, the computer is configured as |follows|:
Shuttle SB52G2 XPC with an optional SCSI Interface or 2nd Rocketdrive
3.06 Ghz Pentium 4 Processor w/Hyperthreading Technology & 533 Mhz Frontside Bus
200 GB Storage Capacity w/8 MB Cache
6 GB Total System Memory
DVD+-RW Drive, capable of Reading/Writing/Re-Writing to DVD/CD Media
6 USB 2.0 Ports
10/100 and 10/100/1000 LAN Interfaces
Floppy Disk Drive
Keyboard/Mouse
Carrying Case
17" Flat Panel Monitor
Microsoft Windows XP Professional SP1
Microsoft Office XP Professional In another embodiment, the computer is configured as follows:
SB51GXPC
3.06 Ghz Pentium 4 Processor w/Hyperthreading Technology & 533 Mhz Frontside Bus
200 GB Storage Capacity w/8 MB Cache
6 GB Total System Memory
DVD+-RW Drive, capable of Reading/Writing/Re-Writing to DVD/CD Media
6 USB 2.0 Ports
2 IEEE 1394 Firewire Ports
10/100 LAN Interface
Floppy Disk Drive
Keyboard/Mouse
Carrying Case
17" Flat Panel Monitor
Microsoft Windows XP Professional SP1
Microsoft Office XP Professional The present invention also includes software and computer programs designed to enable electronic file import/profiling/conversion as described previously.

Numerous modifications and variations of the present invention are possible in light of the above teachings. It is therefore to be understood that within the scope of the appended claims, the invention may be practiced otherwise than as specifically described herein.

The invention claimed is:

1. A computer implemented method of processing and converting electronically-stored data for electronic discovery in support of litigation, the method comprising:
    physically loading and copying data and associated meta-data into a processor-based device by a user at a user-site from one or more data storage devices located at the user-site, said processor-based device being located at said user-site;
    inputting from the user on-site user input to said processor-based device for subsequent processing at the user-site of a working copy of the data and associated meta-data, said subsequent processing including storing in a local storage device said data and associated meta-data as the working copy for file processing, while maintaining a document context with respect to other documents,
    said working copy of the data including a plurality of files;
    said file processing of the plurality of files in the working copy of the data including:
        identifying a duplication of one or more files within the working copy of the data, including
            identifying a duplication by a hash algorithm,
            checking a duplicate file for file corruption, and
            exporting a duplicated file, and
        converting a selected file to an output file in a user-specified format with said processor-based device if said selected file is convertible to the user-specified format, said step of converting including
            extracting and saving file meta-data associated with said selected file,
            extracting text from said selected file, and
            creating an image of said selected file,
        and said file processing further including
            checking for a virus and removing the virus from one or more files, and
            checking for encryption of one or more files, and decrypting said one or more files if encrypted; and
    outputting the output file in the user-specified export format for at least one of exporting, reviewing and searching the output file in an external system, wherein said steps of physically loading and copying, inputting, processing and converting of the file processing, and outputting being performed by said processor-based device at said user-site.

2. The method of claim 1, wherein said converting step includes identifying a file that is not convertible as an exception file.

3. The method of claim 2, wherein said step of outputting comprises:
exporting to at least one of an image viewer, a printer, a computer and another media.

4. The method of claim 3, wherein said step of outputting comprises:
exporting the output file comprising a predetermined litigation support software file type.

5. The method of claim 4, wherein said predetermined litigation support software file type comprises one of:
an PRO file type, an Opticon file type, a Concordance file type, a Summation file type, a Ringtail file type, a Microsoft Access file type, and other data management file types.

6. The method of claim 1, further comprising a step of:
displaying summary statistics prior to said outputting step.

7. The method of claim 6, wherein said step of displaying comprises:
displaying a series of parent-child relationships between a file and an attachment to said file said parent-child relationship being a document context.

8. The method of claim 7, wherein at least said converting step is a step performed in a software plug-in module.

9. The method of claim 1, wherein said metadata comprises:
date created, last date opened, last date modified, creator name, matter name, and predetermined identification and quality control data.

10. The method of claim 1, wherein said step of converting further comprises: marking a file that cannot be converted as an exception file.

11. The method of claim 10, wherein said file that cannot be converted comprises one of:
a file with a virus;
an encrypted file;
a corrupted file;
an unknown file-type; and
a deselected file.

12. The method of claim 10, wherein said step of marking a file that cannot be converted comprises one of:
logging said exception file; and
exporting said exception file.

13. The method of claim 1, wherein said step of physically loading and copying comprises:
transferring via a drag-and-drop user interface comprising one of a computer mouse and a pointing device.

14. The method of claim 1, wherein said working copy comprises:
a time-stamped audit file configured to record a file history spanning file creation to file destruction.

15. The method of claim 1, further comprising:
performing page counts and time stamping or digital authentication of said output file.

16. The method of claim 1, wherein said step of converting comprises:
time stamping and digitally authenticating both an image and a file of extracted meta-data.

17. The method of claim 16, wherein said step of time stamping comprises:
time stamping with one of UTC (Coordinated Universal Time) time and another predetermined time zone.

18. The method of claim 1, wherein said step of converting comprises one of:
time stamping or digitally authenticating the output file; and
appending selected meta-data.

19. The method of claim 18, wherein said step of converting comprises:
creating one or more searchable subordinate text files containing the contents of an operator-selected subset of the selected files;
time stamping or digitally authenticating the one or more subordinate text files; and
appending selected meta-data about the files included in the subordinate text files.

20. The method of claim 1, further comprising:
extracting one of file content data, content header information, file meta-data, file type information, and file characteristic data.

21. The method of claim 1, wherein said associated meta-data comprises:
predetermined categories of meta-data corresponding to a file-type.

22. The method of claim 1, wherein said step of extracting text comprises:
creating an ASCII (American Standard Code for Information Interchange) file of said subset of text.

23. The method of claim 22, wherein said step of extracting text further comprises:
converting said image of said selected file to text with an OCR (optical character recognition) program if an ASCII (American Standard Code for Information Interchange) file cannot be created.

24. The method of claim 1, wherein said step of extracting text comprises:
searching for a keyword.

25. The method of claim 1, wherein said step of extracting text comprises:
extracting a portion of text around said keyword.

26. The method of claim 1, wherein said step of processing and converting comprises:
processing with a prioritization scheme keyed to file type.

27. The method of claim 26, wherein said step of processing with a prioritization scheme comprises:
processing by one of file extension and file header with a plug-in module.

28. The method of claim 27, wherein said step of processing with a plug-in module comprises:
processing with a plug-in module configured to be selected to be 'ON' or 'OFF.'

29. The method of claim 27, wherein said step of processing with a plug-in module comprises;
processing with a plug-in module configured to have a user-selectable priority.

30. The method of claim 27, wherein said step of processing with a plug-in module comprises one of:
processing with a plug-in configured to open multiple file types;
processing with multiple plug-ins configured to open a single file-type;
processing with a plug-in created by incorporating a library of a commercially available software product; and
processing with a plug-in comprising a library of programming code that incorporates functionality of a third party library or an application to load, image and extract meta-data from a document.

31. The method of claim 26, wherein said step of processing with a prioritization scheme keyed to file type comprises at least one of:
identifying a file type extension; and
evaluating a binary file header.

32. The method of claim 31, wherein said step of processing with a prioritization scheme keyed to file type comprises one of:
  identifying said file type extension and evaluating the binary header when the file type extension is unknown; and
  evaluating the binary header, and if there is a conflict between the binary header and the file-type extension, one of the binary header or the file-type extension is considered a default first choice, either arbitrarily or based on a predetermined logic keyed to a predetermined file type.

33. The method of claim 26, wherein said step of processing with a prioritization scheme keyed to file type comprises:
  reading a file that is correlated to a plug-in.

34. The method of claim 33, wherein said step of processing with a prioritization scheme keyed to a file type comprises:
  reading a file that cannot be processed by the plug-in by using a Microsoft Windows File Type Association and accessing a Windows file registry to determine if a "print" verb is associated with the extension in Windows operating system;
  if said "print" verb is found to be associated with the extension, starting a new Windows operating system process with said "print" verb as startup information and feeding the output of said new Windows operating system process to an imaging print driver.

35. The method of claim 1, wherein said step of converting comprises:
  imaging with an imaging driver.

36. The method of claim 1, further comprising:
  pre-filtering and saving pre-filtering criteria.

37. The method of claim 1, wherein said step of physically loading and copying comprises:
  accessing data from an email or instant messaging archive.

38. The method of claim 37, wherein said step of accessing data from an email or instant message archive comprises:
  accessing a printable attachment of an email or instant message.

39. A system for processing and converting electronically-stored data for electronic discovery in support of litigation, the system comprising:
  a data input device configured to allow a user to physically load and copy data and associated meta-data at a user-site from one or more data storage devices located at the user-site into a processor-based device located at said user-site;
  an interface configured to receive on-site user input into said processor-based device for subsequent file processing at the user-site of a working copy of the data and associated meta-data;
  a memory;
  a processor configured to store in a local storage device said data and associated meta-data as the working copy, while maintaining a document context with respect to the other documents, said working copy of the data including a plurality of files,
  said file processing of the plurality of files in the working copy of the data including:
    identifying a duplication of one or more files within the working copy of the data, including
      identifying a duplication by a hash algorithm,
      checking a duplicate file for file corruption, and
      exporting a duplicated file, and
    said processor also configured to convert a selected file to an output file in a user-specified format if said selected file is convertible to a user-specified format, said converting including
      extracting and saving file meta-data associated with said selected file,
      extracting text from said selected file, and
      creating an image of said selected file, said processor being inside said processor-based device, and
    said file processing further including
      checking for a virus and removing the virus from one or more files, and
      checking for encryption of one or more files, and decrypting said one or more files if encrypted; and
  an output mechanism configured to output the output file in the user-specified export format for at least one of exporting, reviewing and searching the output file in an external system, wherein said data input device, said interface, and said processor inside said processor-based device being located on said user-site.

40. A computer readable storage medium including instructions that when executed by a computer, controlling the computer so as to process and convert electronically-stored data for electronic discovery in support of litigation, the instructions comprising steps of:
  physically loading and copying data and associated meta-data into a processor-based device by a user at a user-site from one or more data storage devices located at the user-site, said processor-based device being located at said user-site;
  inputting from the user on-site user input to said processor-based device for subsequent processing at the user-site of a working copy of the data and associated meta-data, said subsequent processing including
  storing in a local storage device said data and associated meta-data as the working copy for file processing, while maintaining a document context with respect to other documents,
  said working copy of the data including a plurality of files;
  said file processing of the plurality of files in the working copy of the data including:
    identifying a duplication of one or more files within the working copy of the data, including
      identifying a duplication by a hash algorithm,
      checking a duplicate file for file corruption, and
      exporting a duplicated file, and
    converting a selected file to an output file in a user-specified format with said computer if said selected file is convertible to the user-specified format, said step of converting including
      extracting and saving file meta-data associated with said selected file,
      extracting text from said selected file, and
      creating an image of said selected file,
    and said file processing further including
      checking for and removing a virus from one or more files, and
      checking for encryption of one or more files, and decrypting said one or more files if encrypted; and
  outputting the output file in the user-specified export format for at least one of exporting, reviewing and searching the output file in an external system, wherein said steps of physically loading and copying, inputting, processing and converting of the file processing, and outputting being performed by said processor-based device at said user-site.

* * * * *